United States Patent [19]

Breault et al.

[11] Patent Number: 5,270,132

[45] Date of Patent: Dec. 14, 1993

[54] MINIMIZED CORROSION FUEL CELL DEVICE AND A METHOD OF MAKING THE SAME

[75] Inventors: Richard D. Breault, Coventry; Anthony P. Mientek, Glastonbury; Richard D. Sawyer, Canton, all of Conn.

[73] Assignee: International Fuel Cells Corporation, South Windsor, Conn.

[21] Appl. No.: 813,469

[22] Filed: Dec. 26, 1991

[51] Int. Cl.$^5$ ............................................. H01M 4/96
[52] U.S. Cl. ........................................ 429/35; 429/40; 427/115
[58] Field of Search ........................ 429/40, 41, 42, 44, 429/35, 36, 185; 29/623.1, 623.5; 427/115

[56] References Cited

U.S. PATENT DOCUMENTS

| | | | |
|---|---|---|---|
| 4,756,980 | 7/1988 | Niksa et al. | 429/209 X |
| 4,781,727 | 11/1988 | Mitsuda et al. | 429/35 X |
| 4,786,568 | 11/1988 | Elmore et al. | 429/44 |
| 4,978,591 | 12/1990 | Wright | 429/35 |
| 4,985,316 | 1/1991 | Bose et al. | 429/44 |

*Primary Examiner*—Anthony Skapars
*Attorney, Agent, or Firm*—Peter R. Ruzek

[57] ABSTRACT

A carbon-based material substrate of a cathode electrode of an acid electrolyte fuel cell is made corrosion resistant by depositing a material that is nonwettable by the electrolyte on that major surface of the substrate which carries a catalyst layer all over except for its edge regions to cover such major surface at least at one of those of its edge regions which are exposed to an oxidizing gas during the operation of the fuel cell, but advantageously also at an additional one of its edge regions that is remote from the one edge region but is also exposed to an oxidizing gas during the operation of the fuel cell. The corrosion resistance can be further improved by extending the catalyst layer of the anode electrode on all sides beyond the cathode catalyst layer.

7 Claims, 1 Drawing Sheet

# MINIMIZED CORROSION FUEL CELL DEVICE AND A METHOD OF MAKING THE SAME

DESCRIPTION

Technical Field

The present invention relates to fuel cell devices in general, and more particularly to acid fuel cells.

Background Art

There are already known various constructions of fuel cell devices, among them those using an acid electrolyte. As is well known, a fuel cell device usually includes a plurality of individual fuel cells that are juxtaposed with one another and with other components to form a fuel cell assembly or stack. Each of the fuel cells of this type typically includes a plate-shaped cathode component provided with a layer of cathode catalyst at an active one of its major surfaces, a plate-shaped anode component provided with an anode catalyst layer at its active major surface that faces the active major surface of the cathode component in the assembled condition of the fuel cell, and an electrolyte matrix interposed between the active major surfaces of the cathode and anode components and containing a quantity of the electrolyte that is required for the performance of the electrochemical reaction that is to take place in the fuel cell during the operation of the fuel cell device. Each of the cathode and anode components, in turn, may and usually does include more than one plate-shaped constituent member, such as a catalyst support plate and an electrolyte retention plate. Such constituent members will be individually or collectively referred to hereinafter as substrates, without differentiation unless necessary.

In the course of operation of the fuel cell, oxidizing gas, such as air or oxygen, is to be distributed all over the cathode catalyst layer, while a gaseous fuel, such as hydrogen, is to be distributed all over the anode catalyst layer. This is ordinarily accomplished by making the cathode and anode components porous, and by supplying the oxidizing gas and gaseous fuel to the cathode substrate and the anode substrate, respectively. Because of its porosity, at least one of the cathode and anode substrates may also serve as an electrolyte reservoir plate, that is, it may accommodate in its pores, at the time of assembly of the fuel cell device, a predetermined amount of replenishment electrolyte that is then used during the operation of the fuel cell device automatically to replenish any electrolyte that may have been lost from the electrolyte matrix or edge seals due to various causes.

In any event, the material of the respective one of the cathode and anode substrates gets in intimate contact with the electrolyte and/or the respective one of the oxidizing gas and gaseous fuel at least at those regions thereof that face the electrolyte matrix and are not covered by the respective cathode and anode catalyst layers (edge regions). This, of course, means that the material or materials of the substrates must be of the kind that does not react with or is not otherwise damaged by the electrolyte. For this reason, carbon-based materials, such as those containing carbon or graphite, are being typically used for the cathode and anode substrates.

Such carbon-based materials also do not react with the fuel. However, experience has shown that, under certain circumstances, the carbon-based material of the cathode substrate may be subject to corrosion at the aforementioned edge regions. This is attributable not only to the fact that oxygen and water are or may be present at or reach such edge regions, but also to the fact that mixed potential resulting from the electrochemical reaction does or may exist locally. Obviously, such corrosion (oxidation) has deleterious effects on the structural integrity and other properties of the affected substrate, which may ultimately lead to mechanical failure and cross-over, ultimately resulting in failure of the fuel cell in which such corrosion is encountered.

Accordingly, it is a general object of the present invention to avoid the disadvantages of the prior art.

More particularly, it is an object of the present invention to provide a fuel cell which does not possess the disadvantages of the known fuel cells of this kind.

Still another object of the present invention is so to develop the fuel cell of the type here under consideration as to minimize if not eliminate the corrosion of the carbon-based cathode substrate material.

It is yet another object of the present invention to design the fuel cell of the above type in such a manner as to be relatively simple in construction, inexpensive to manufacture, easy to use, and yet reliable in operation.

A concomitant object of the present invention is to devise a method of producing a fuel cell of the above type which is relatively inexpensive and easy to perform.

DISCLOSURE OF THE INVENTION

In keeping with these objects and others which will become apparent hereafter, one feature of the present invention resides in a corrosion-resistant cathode electrode of an acid electrolyte fuel cell. The cathode electrode includes a plate-shaped substrate of a carbon-based material having two oppositely facing major surfaces, and a catalyst layer situated at one of the major surfaces and extending all over such one major surface except for its respective edge regions. According to the invention, a quantity of a material that is nonwettable by the electrolyte is deposited on the substrate at the one of its major surfaces to cover the carbon-based material at least at one of the edge regions that is exposed to an oxidizing gas during the operation of the fuel cell to exclude the electrolyte from such edge region.

According to another aspect of the present invention, there is provided an improvement in an acid electrolyte fuel cell of the type having a cathode electrode including a plate-shaped cathode substrate of a carbon-based material and a layer of cathode catalyst situated at one major surface of the cathode substrate and extending all over such one major surface except for respective edge regions thereof, an anode electrode including a plate-shaped anode substrate and a layer of anode catalyst situated at one major surface of the anode substrate and extending all over such one major surface except for respective edge regions thereof, an electrolyte matrix interposed between the major surfaces of the cathode and anode substrates between the catalyst layers as well as the edge regions, and a body of acid electrolyte contained at least in the electrolyte matrix. The improvement presented in accordance with the present invention includes a quantity of a material that is nonwettable by the electrolyte deposited on the cathode substrate at the aforementioned one major surface thereof to cover the carbon-based material at least at that one of the edge regions thereof which is exposed to an oxidizing gas during the operation of the fuel cell to exclude the electrolyte from such one edge region.

The present invention is also directed to a method of manufacturing a corrosion-resistant cathode electrode of an acid electrolyte fuel cell, which method includes the steps of providing a plate-shaped porous substrate of a carbon-based material having two oppositely facing major surfaces; forming a catalyst layer situated at one of the major surfaces and extending all over such one major surface except for respective edge regions thereof; and depositing a quantity of a material that is nonwettable by the electrolyte on the substrate at the one major surface thereof to cover the carbon-based material at least at that of the edge regions which is exposed to an oxidizing gas during the operation of the fuel cell to exclude the electrolyte from such edge region.

BRIEF DESCRIPTION OF THE DRAWING

The present invention will be described in more detail below with reference to the accompanying drawing in which.

BEST MODE FOR CARRYING OUT THE INVENTION

Figure 1:
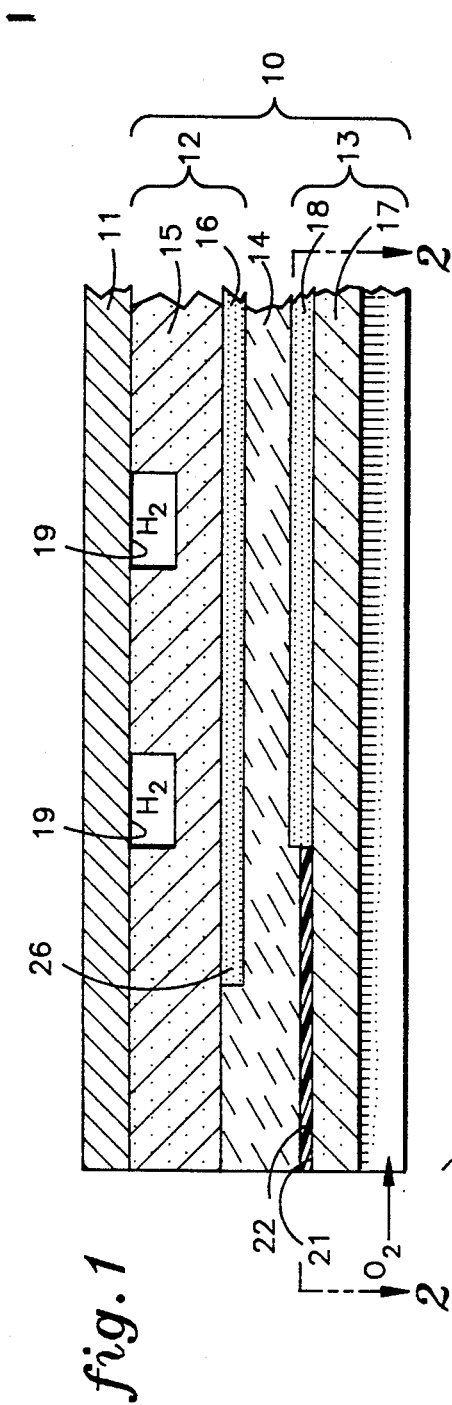
FIG. 1 is a sectional view, at a somewhat enlarged scale, of a fragment of an acid electrolyte fuel cell including a cathode electrode that is made corrosion resistant in accordance with the present invention.

Referring now to the drawing in detail, and first to FIG. 1 thereof, it may be seen that the reference numeral 10 has been used therein to identify a fuel cell, while the reference numeral 11 indicates a fluid impermeable separator plate that is interposed between the fuel cell 10 and a nonillustrated identical adjacent fuel cell of a fuel cell stack and thus isolates such adjacent fuel cells 10 from one another as far as cell-to-cell travel of gases and liquids is concerned. However, as is usual, the separator plate 11 is made of or contains material, such as carbon in one of its forms, that is electrically conductive to establish electrical series connection between such adjacent fuel cells 10 of the stack.

The fuel cell 10 as illustrated includes an anode electrode 12, a cathode electrode 13 and an electrolyte matrix 14 interposed between and at least substantially coextensive with the anode and cathode electrodes 12 and 13. The anode electrode 12 includes an anode substrate 15 and an anode catalyst layer 16, while the cathode electrode 13 includes a cathode substrate 17 and a cathode catalyst layer 18. The anode and cathode substrates 15 and 17 are formed, at their sides facing away from the electrolyte matrix 14, with respective pluralities of channels 19 and 20 only some of which are shown. The channels 19 serve to supply a gaseous fuel, such as substantially pure hydrogen ($H_2$), to the backside of the anode substrate 15. On the other hand, the channels 20, which extend, as usual, orthogonally to the channels 19, are to be used to supply an oxidizing gas, such as substantially pure oxygen ($O_2$) or air, to the backside of the cathode substrate 17.

The electrolyte matrix 14 is porous and is charged, at the time of assembly of the fuel cell 10, with a sufficient quantity of electrolyte to fill substantially all of the pores thereof. The substrates 15 and 17 are porous as well, if not for any other reason then to permit the respective gaseous media (oxidizing gas or gaseous fuel) present in the respective channels 19 and 20 to reach and be as uniformly as possible distributed over the respective catalyst layers 16 and 18. However, in some instances, each of the substrates 15 and 17, or at least one of them, also serves as an electrolyte reservoir plate in that an amount of replenishment electrolyte is contained in some of its pores, with this replenishment amount being used during the operation of the fuel cell 10 to replenish any quantity of electrolyte that may have been lost from the electrolyte matrix 14 due to a variety of causes, such as evaporation.

The construction of the fuel cell 10 as described so far is conventional so that it is not necessary to elaborate thereon, or on the operation of the fuel cell 10, any further. Suffice it to say that a well-known electrochemical reaction takes place in the fuel cell 10 during its operation, basically in the space bounded by the catalyst layers 16 and 18, resulting in the formation of at least one reaction product (water when the gaseous fuel is hydrogen) and generation of an electrical potential difference between the electrode plates 12 and 13 (mainly but not necessarily exclusively between the catalyst layers 16 and 18). It is this electrical potential difference, coupled with the movement of electric charge carriers between the electrodes 12 and 13, that is being used as a useful output of the fuel cell 10, that is, electric power.

As alluded to before, each of the substrates 15 and 17 must be made of a material that is resistant to attack by the electrolyte and reactants. In fuel cells 10 of the type here under consideration, where the electrolyte consists of or contains an acid, such as phosphoric acid ($H_3PO_4$), it is customary to make each of the substrates 15 and 17 of a carbon-based material, that is, of a material that contains a considerable proportion of carbon in one of its forms. For all intents and purposes, there is hardly any danger that the carbon contained in such a material would react with either the electrolyte or the fuel, and ordinarily such carbon does not become oxidized either.

However, experience has shown that, because of the existence of local electrochemical potentials, the following reaction:

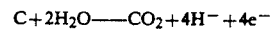

$$C + 2H_2O \longrightarrow CO_2 + 4H^+ + 4e^-$$

may take place at least at those regions of the cathode substrate 17 that are not covered by the catalyst layer 18 and are accessible to liquids and oxygen, with the thus formed carbon dioxide ($CO_2$) escaping. Obviously, any carbon atom from the cathode substrate 17 that enters this reaction is irretrievably lost from the substrate 17, thus impairing the structural integrity of the substrate 17 at the affected region.

Experience has shown that the substrate 17 is more vulnerable to this kind of attack at its edge region 21 particularly at the area at which oxygen or other oxidizing gas enters or leaves the channels 20 than at other regions, and that the degree of such vulnerability increases with increasing distance from the edge of the cathode catalyst layer 18. For this reason, it is proposed in accordance with the present invention to make at least this edge region 21 wetproof so as to prevent the electrolyte, that is, all liquids that may be present in the electrolyte, from reaching this region. This expedient is depicted in FIG. 1 of the drawing, only to facilitate illustration, in the form of a separate layer 22 of a wetproofing material deposited on the edge region 21.

However, it will be appreciated that the desired effect can be achieved only by impregnating the wetproofing material directly into the pores of the edge region 21 at least to a certain depth, if not throughout the thickness of edge region 21 of the substrate 17. In either case, the wetproofing material, even if not fully encasing the carbon particles present in the affected edge region 21, will prevent acid from penetrating into the thus treated or impregnated edge region 21 and thus interrupt at least the electric continuity that is a prerequisite for the above reaction to occur in the first place.

Figure 2:
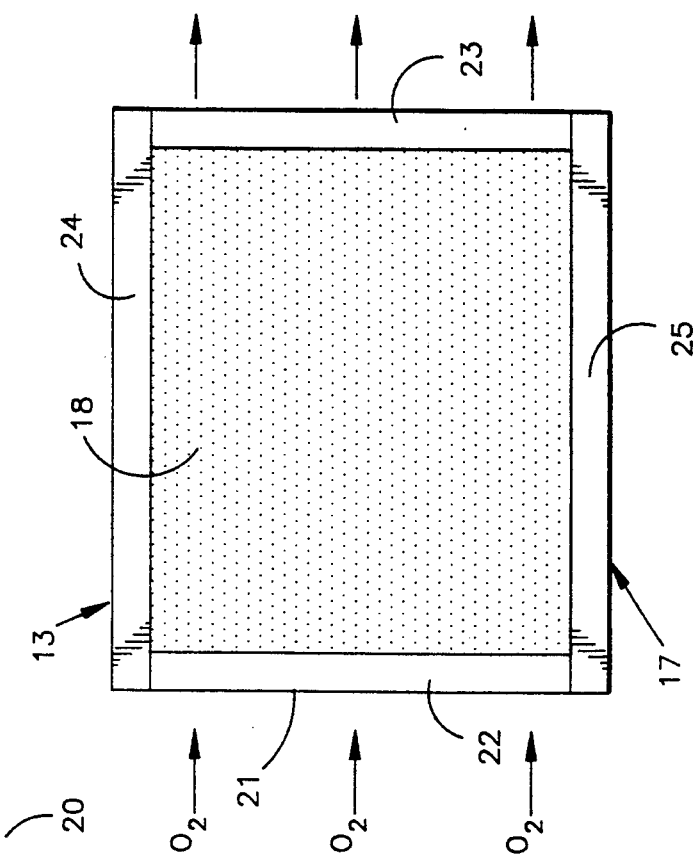
FIG. 2 is a top plan view, at a different scale, of the cathode electrode embodying the present invention, taken on line 2—2 of FIG. 1.

Turning now to FIG. 2 of the drawing, it may be seen that there is provided not only the wetproofed edge region 22 but also another wetproofed edge region 23 disposed at an end of the cathode substrate 17 that is remote from the edge region 21, that is, at an area at which, as indicated by respective arrows, the cathode exhaust gas, which, albeit oxygen-depleted, still contains a substantial percentage of oxygen and water vapor, leaves the cathode electrode 12. On the other hand, it is also shown there that respective side edge regions 24 and 25, which have been found to be much less vulnerable to such attack than those indicated above to be protected by the wetproofing material, need not be protected by their own quantities of wetproofing material. However, as customary, they may be made gas-impermeable by providing them with seals, such as wet seals.

There are several materials that are suitable for use as the wetproofing materials. Some of these materials are fluoroethylene propylene (FEP), tetrafluoroethylene (TFE), perfluouroalkoxy ethylene (PFA), or a fluoroelastomer, such as that distributed by the 3M Company under the trademark Fluorel. It has been established that an FEP loading of as little as $0.2 g/cm^3$ may be adequate to accomplish the purpose stated above; however, higher loadings, up to and including complete filling of the pores of the affected edge region 21 or 22, are currently preferred because they give more assurance that the desired corrosion protection is actually achieved. The above materials can be applied in various known ways, but it is particularly advantageous to apply them by the screen printing technique because this approach assures contiguity of the wetproofed regions 22 and 23 with the catalyst layer 18, on the one hand, and proper distribution of the respective wetproofing material used over and/or into the affected edge region, such as 22, on the other hand.

FIG. 1 of the drawing also illustrates another approach which is used in accordance with the present invention to further reduce the likelihood of carbon corrosion at the affected edge zone 22. As shown there, the anode catalyst layer 16 has a portion 26 which extends beyond the cathode catalyst layer 18. As a matter of fact, the anode catalyst layer 16 is larger than the cathode catalyst layer 18 at all of the remaining edge regions as well.

The reason for resorting to this expedient is that, unlike in an ideal situation where the two catalyst layers 16 and 18 would be perfectly positioned relative to one another and hence could be exactly of the same size, in actual practice this perfect alignment and, for that matter, even the exactness of the locations of all of the edges of the catalyst layers 16 and 18, cannot always be assured. Thus, when such theoretically equal-size catalyst layers 16 and 18 are used, as is the current practice, it happens quite often that, because of manufacturing tolerances and/or stacking or other alignment errors, the cathode catalyst layer 18 extends at least locally beyond the anode catalyst layer 18. This results in a reduced local current density and thus increased electrolyte potential for the cathode 13 at such affected location. If the extent of such projection of the cathode catalyst layer 18 beyond the anode catalyst layer 16 were large enough, the cathode electrode 13 could sit close to its open circuit potential or mixed potential. In this situation, any unprotected carbon and/or even catalyst material present at a zone of the respective cathode electrode 13 that does not face an associated portion of the anode catalyst layer 16 is vulnerable to oxidation or corrosion, be it carbon or catalyst present in the catalyst layer 18, or carbon contained in the edge region, such as 22, of the cathode substrate 17 adjoining the edge of the cathode catalyst layer 18 at this location. This vulnerability is caused or exacerbated by the existence of the aforementioned electric potential difference between the electrodes 15 and 17, especially if the extent of projection of the cathode catalyst layer 18 beyond the anode catalyst layer 16 is so great that the local electric potential exceeds the corrosion potential of the material in question.

The solution discussed just above avoids this problem. More particularly, inasmuch as the anode catalyst layer 16 is oversized relative to the cathode catalyst layer 18 (in all directions), the potentially dangerous corrosive situation outlined above cannot come into being because the anode catalyst layer 16 will always extend beyond the cathode catalyst layer 18, no matter how large the manufacturing, stacking or other alignment errors, provided that the extent of projection of the anode catalyst layer 16 beyond the cathode catalyst layer 18 is chosen to be large enough to take any and all of such possible errors into consideration. Experience has shown that it is advantageous to make the anode catalyst layer 16 larger than the cathode catalyst layer 18 by about 0.15" at each of its edges since this gives a sufficient assurance that the aforementioned deleterious situation will not be encountered even in the worst-case scenario. However, this projection extent can be reduced depending on circumstances, so long as it is assured that it is sufficient to accomplish the above purpose under all circumstances.

While the present invention has been illustrated and described as embodied in a particular construction of a phosphoric acid electrolyte, hydrogen/oxygen fuel cell, it will be appreciated that the present invention is not limited to this particular example; rather, the scope of protection of the present invention is to be determined solely from the attached claims.

We claim:

1. A corrosion-resistant cathode electrode of an acid electrolyte fuel cell, comprising a plate-shaped porous substrate of a carbon-based material capable of receiving the electrolyte in respective pores thereof throughout and having two oppositely facing major surfaces;

a catalyst later situated at one of said major surfaces and extending all over such one major surface except for respective edge regions thereof that collectively constitute an edge portion extending around said catalyst later; and a quantity of a material that is nonwettable by the electrolyte deposited on said carbon-based material of only said edge portion of said substrate at said one major surface thereof so as to cover said carbon-based material of at least that one of said edge regions of said edge portion that is exposed to an oxidizing gas during the operation of the fuel cell to exclude the electrolyte from said carbon-based material of such one edge region.

2. The cathode electrode as defined in claim 1, and further comprising an additional quantity of said electrolyte nonwettable material deposited on said substrate at said one major surface thereof to cover the carbon-based material at an additional one of said edge regions that is remote from said one edge region but is also exposed to an oxidizing gas during the operation of the fuel cell to exclude the electrolyte from such additional edge region.

3. In an acid electrolyte fuel cell of the type having a cathode electrode including a plate-shaped porous cathode substrate of a carbon-based material capable of receiving the electrolyte in respective pores thereof throughout and a layer of cathode catalyst situated at one major surface of the cathode substrate and extending all over such one major surface except for respective edge regions thereof that collectively constitute an edge portion extending around the cathode catalyst layer, an anode electrode including a plate-shaped anode substrate and a layer of anode catalyst situated at one major surface of the anode substrate and extending all over such one major surface except for respective edge regions thereof, an electrolyte matrix interposed between the major surfaces of the cathode and anode substrates between the catalyst layers as well as the edge regions, and a body of acid electrolyte contained at least in the electrolyte matrix, the improvement comprising a quantity of a material that is nonwettable by the electrolyte deposited on the carbon-based material of only the edge portion of the cathode substrate at the one major surface thereof so as to cover the carbon-based material of at least that one of the edge regions of the edge portion that is exposed to an oxidizing gas during the operation of the fuel cell to exclude the electrolyte from the carbon-based material of such one edge region.

4. The improvement as defined in claim 3, and further comprising an additional quantity of said electrolyte nonwettable material deposited on the substrate at the one major surface thereof to cover the carbon-based material at an additional one of the edge regions that is remote from the one edge region but is also exposed to an oxidizing gas during the operation of the fuel cell to exclude the electrolyte from such additional edge region.

5. The improvement as defined in claim 3, wherein the anode catalyst layer extends beyond the cathode catalyst layer all around the periphery thereof, making all of the edge regions of the anode substrate narrower than the corresponding edge regions of the cathode substrate.

6. A method of manufacturing a corrosion-resistant cathode electrode of an acid electrolyte fuel cell, comprising the steps of providing a plate-shaped porous substrate of a carbon-based material capable of receiving the electrolyte in respective pores thereof throughout and having two oppositely facing major surfaces;

forming a catalyst layer situated at one of the major surfaces and extending all over such one major surface except for respective edge regions thereof that collectively constitute an edge portion extending around the cathode catalyst layer; and depositing a quantity of a material that is nonwettable by the electrolyte on the carbon-based material of only the edge portion of the cathode substrate at the one major surface thereof so as to cover the carbon-based material at least at that one of the edge regions of the edge portion that is exposed to an oxidizing gas during the operation of the fuel cell to exclude the electrolyte from the carbon-based material of such one edge region.

7. The method as defined in claim 6, and further comprising the step of depositing an additional quantity of the elctrolyte nonwettable material on the substrate at the one major surface thereof to cover the carbon-based material at an additional one of the edge regions that is remote from the one edge region but is also exposed to an oxidizing gas during the operation of the fuel cell to exclude the electrolyte from such additional edge region.

* * * * *